United States Patent Office 3,577,277
Patented May 4, 1971

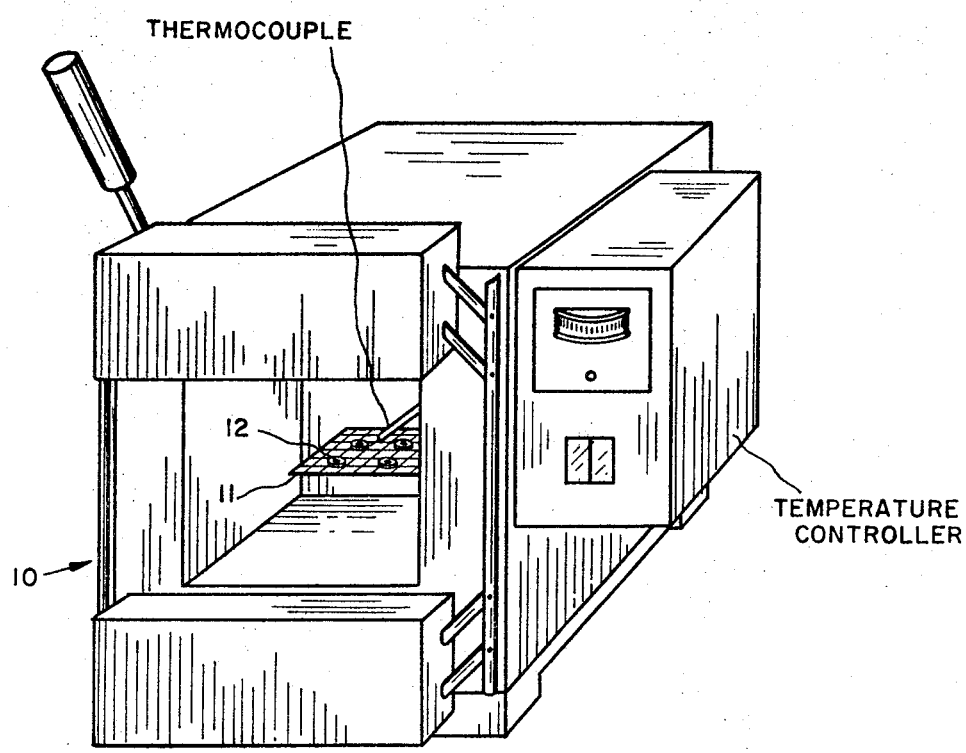

3,577,277
POLYMER COATINGS
Robert D. Fisher, Woodstock, and James A. Magee, Saugerties, N.Y., assignors to Ferroxcube Corporation, Inc., Saugerties, N.Y.
Filed Dec. 26, 1968, Ser. No. 786,998
Int. Cl. H01f 10/02; B44d 1/46
U.S. Cl. 117—234
2 Claims

ABSTRACT OF THE DISCLOSURE

A post treatment process of improving the characteristics of poly p-(xylylene) coated ferrite articles by heating the article to at or just above the melting point of the polymer and maintaining the temperature for a specified duration.

---

This invention relates to a process for post treating substrates coated with a synthetic organic polymer and particularly to a process for improving the surface characteristic of polymer coating of a thermoplastic film.

Thermoplastic films based upon the series of polymers derived from poly (p-xylylenes) are commonly utilized as surface coatings because of their desirable characteristics of high resistance to thermal and chemical deterioration. These polymers are unique in that they can be deposited on almost any solid surface by a vacuum process that resembles vapor deposition. The deposition process or technique consists of three steps: (1) sublimation under vacuum at 100 to 300° C. of the stable, crystalline dimer, di-p-xylylene to produce vapors thereof; (2) pyrolysis of the vapors at 500 to 750° C. to form gaseous p-xylylene, the reactive monomer and finally (3) deposition and simultaneous polymerization of the p-xylylene to form poly (p-xylylene). The thickness of the coating deposited on the substrate may be varied from thin films ($8 \times 10^{-4}$ mm.) to thick films (2 to 3 mm.) by varying the amount of dimer sublimed in step (1).

The foregoing deposition process and the apparatus therefor, is described in full detail by Loeb et al. in U.S. Pat. No. 3,246,627 issued Apr. 19, 1966 and assigned to the Union Carbide Corporation.

The resultant end effect of the foregoing described process is to place a thermoplastic film upon a desired substrate to improve the surface characteristic thereof. With regard to the implementation of the foregoing process to coat linear ferrite toroids it has been found that the surface coating of the coated toroid often contains surface imperfections in the form of blisters or the like and may generally be unattractive. The coated surface coloration of the toroid has a light grey appearance, and possesses a relatively high coefficient of friction. The translucency of the polymer coating renders the color of the coated toroid similar to that of the uncoated toroid which makes observation of the completeness of the coating difficult.

Further, it has been found that attempts during the coating process to improve the surface characteristics and vary the coloration of the coating inevitably affect the quality of the process itself, thereby obviating the entire purpose of the coating process.

It is therefore a primary object of the invention to improve the characteristic of a surface coating of poly (p-xylylene) without affecting or altering in any way the process of coating.

A post treatment process relating to poly (p-xylylene) coatings has been discovered specifically for linear ferrite toroids which significantly alters the physical properties and appearance of the coating in a manner which improves the surface characteristics including smoothness, appearance, adhesion and color of the coating. The post treatment process consists of heating or heat treating the toroid coating, in a heating chamber at a temperature just above the melting point of the polymer. After a first exposure time the coating on linear ferrite toroids appears dark green in color. However, after a longer exposure time the coating appears as a deep, dark black color. Without post treatment the coated toroid has a light grey appearance rather than dark green or dark black.

The foregoing objects and brief description as well as other objects and advantages of the invention, will become more apparent to the skilled practitioner from the following discussion and the appended drawing, wherein the figure illustrates the chamber wherein the post treatment occurs.

In accordance with the foregoing objects and brief description, the present invention relates to a post treatment process relating to poly (p-xylylene) coatings specifically on linear ferrite toroids which significantly alters the physical properties and apperance of the coating in a manner which improves the surface characteristics and appearance and color of the coating. The post treatment process consists of heating or heat treating the coating at a temperature just above the melting point of the polymer; namely, between 280° C. to 350° C. or over for a period of time ranging from 3 minutes to 25 minutes. At 3–8 minute exposure times, at 300° C., the coating on linear ferrite toroids has a glazed or semi-glossy, dark green bordering on black appearance. However, at exposure times of 10–25 minutes the parylene appears as a glazed or semi-glossy dark black color. Without post treatment the coated toroid has a light grey appearance rather than dark green or dark black.

The above described effect is believed to be a form of oxidation resulting from the heat treatment. The smoothing or gloss surface of the final article results from a "flow" effect which takes place within the coating and which eliminates blistering and improves the adhesion and surface roughness of the coating to the linear ferrite toroid.

The post treatment can take place in any suitable heat treatment chamber under varying atmospheric conditions and pressures. It has been found that the flow characteristic of the toroid surface during the heat treatment is least inhibited if the supporting surface is a wire mesh or screen.

The only critical parameters which have been noted are the requisite temperature level and the variable time duration necessary for establishing the flow effect and to enhance the color, smoothness, etc.

The examples shown below are illustrative of the novel method that has herein been described. The examples are in no way intended to restrict the scope of the present invention.

EXAMPLE I

A post treatment of coated linear ferrite toroids consists of starting with a toroid coated as described in Example 1 of U.S. Pat. 3,246,627 and placing it into an oven or muffle furnace such as manufactured by The Thermolyne Corporation, Dubuque, Iowa, for a specified time and temperature. In conjunction with the muffle furnace, a suitable temperature controller is utilized such as that manufactured by The Barber Colman Company, Rockford, Ill., model number 292P. The temperature on the controller is set at the desired temperature for post treatment, namely 300° C. After inserting or placing the toroid in the muffle furnace and removing after a specified time at a specified temperature. The toroid will appear dark green or dark black. Thus, a toroid with a 1.0 mil thickness of coating is inserted into the furnace at a temperature of 300° C. for a time of twenty minutes, will appear a dark black after removal from the furnace, the original appearance being a light grey.

EXAMPLE II

The above process may be carried out using a toroid coated with a 0.5 mil thickness of the coating for a time of five minutes at a temperature of 300° C. and will appear dark green bordering on black whereas the original color was light grey.

EXAMPLE III

The process may be carried out the same as in Example I where a toroid coated with a 0.25±0.05 mil coating thickness is post treated at a temperature of 300° C. for eight minutes and will appear dark green bordering on black whereas the original color was light grey.

EXAMPLE IV

The process being the same as in Example I wherein the toroid is coated with a 0.5 mil coating thickness at a temperature of 300° C. for a time of fifteen minutes will appear dark black whereas the original color is light grey.

EXAMPLE V

A process the same as in Example I wherein a toroid with a 0.5 mil coating thickness is post treated at a temperature of 300° C. for a period of time of 1 minute and will appear light grey or the same color as the original or unheated coated toroid.

EXAMPLE VI

A process described in Example I wherein a toroid coated with a thickness of 0.25±0.05 mil is post treated at a temperature of 300° C. for a period of time of twenty minutes and will appear a dark black whereas the original toroid is light grey.

EXAMPLE VII

The process will be carried out the same as in Example I wherein the toroid is coated with a 1 mil thickness at a temperature of 350° C. for a time of three mintues will appear dark green whereas the original color is light grey.

EXAMPLE VIII

The process being the same as in Example I wherein the toroid is coated with a 0.25±0.05 mil thickness at a temperature of 350° C. for a time of ten minutes will appear dark black whereas the original color is light grey.

EXAMPLE IX

The process being the same as in Example I wherein the toroid is coated with a 0.25±0.05 mil thickness or a 0.5 mil thickness or a 1.0 mil thickness at a temperature of 250° C. for any length of time, toroids will appear light grey whereas the original color is light grey.

Referring to FIG. 1, there is shown a simplified illustration of the physical arrangement employed to post treat the toroids. A heat chamber 10 is provided with a mesh screen 11 for supporting toroids 12. The screen mesh is used to prevent the coating from adhering to the support surface.

Referring to Table I, a summary of the range of examples and results of the heat treatment is shown. The examples of improved characteristics are denoted by an asterisk.

TABLE I

| Coating thickness | Temperature, °C. | Time | Appearance | Average surface roughness |
|---|---|---|---|---|
| 0 | Room | N/A | Light grey | 50±2.µ inches. |
| 0.25 | Room | N/A | do | 52.5±1.5 |
| 0.5 | Room | N/A | do | 62.0±2.0 |
| 1.0 | Room | N/A | do | 75.0±3.0. |
| 1.0 | 300 | 20 | Dark black* | 36.0µ inches*. |
| 0.5 | 300 | 5 | Dark green bordering on black*. | Do. |
| 0.25 | 300 | 8 | do | 58.0µ inches. |
| 0.5 | 300 | 15 | Dark black* | 44.0µ inches*. |
| 0.5 | 300 | 1 | Light grey | 64.0µ inches. |
| 0.25 | 300 | 20 | Dark black* | 52.0µ inches. |
| 1.0 | 350 | 3 | Dark green bordering on black*. | 44.0µ inches*. |
| 0.25 | 350 | 10 | Dark black* | 52.0µ inches. |
| 0.25 | 250 | x | Light grey | 52.5±1.5. |
| 0.5 | 250 | x | do | 62.0±2.0. |
| 1.0 | 250 | x | do | 75.0±3.0. |

Since certain changes and modifications can be readily entered into in the practice of the present invention without departing substantially from its intended spirit or scope, it is to be fully understood that all of the foregoing description and specification be interpreted and construed as being merely illustrative of the invention and in no sense or manners as being limiting or restrictive thereof excepting as it is set forth and defined in the appended claims.

What is claimed is:

1. A method of improving the surface characteristic of a ferrite coated with a (p-xylylene) polymer to a thickness of at least 0.25 mil, comprising the steps of heating said coated ferrite to a temperature level of between 280° C. and 350° C. and maintaining said temperature level for a period of time of at least 3 minutes.

2. A method of improving the surface characteristic of a ferrite toroid coated with a (p-xylylene) polymer to a thickness ranging between 0.25 mil and 1.0 mil, comprising the steps of heating said coated ferrite toroid to a temperature range of between 300° C. and 350° C. and maintaining said temperature level for a period of time within the range of 3 minutes to 20 minutes.

References Cited

UNITED STATES PATENTS

| 3,246,627 | 4/1966 | Loeb et al. | 117—95X |
| 3,279,945 | 10/1966 | Haines et al. | 117—234 |
| 3,148,077 | 9/1964 | Garetto | 117—63X |

WILLIAM D. MARTIN, Primary Examiner

B. D. PIANALTO, Assistant Examiner